United States Patent
Nabozny

(10) Patent No.: US 9,006,123 B2
(45) Date of Patent: Apr. 14, 2015

(54) CATALYTIC REFORMER CATALYST COLLECTOR INCLUDING PURGE GAS STREAM

(75) Inventor: Brian Nabozny, Des Plaines, IL (US)

(73) Assignee: UOP LLC, Des Plaines, IL (US)

( * ) Notice: Subject to any disclaimer, the term of this patent is extended or adjusted under 35 U.S.C. 154(b) by 1028 days.

(21) Appl. No.: 12/342,357

(22) Filed: Dec. 23, 2008

(65) Prior Publication Data

US 2010/0160148 A1 Jun. 24, 2010

(51) Int. Cl.
- *B01J 20/34* (2006.01)
- *B01J 38/02* (2006.01)
- *B01J 38/10* (2006.01)
- *C01B 3/38* (2006.01)

(52) U.S. Cl.
CPC *B01J 38/02* (2013.01); *B01J 38/10* (2013.01); *C01B 3/38* (2013.01); *C01B 2203/0233* (2013.01)

(58) Field of Classification Search
None
See application file for complete search history.

(56) References Cited

U.S. PATENT DOCUMENTS

| | | | |
|---|---|---|---|
| 2,776,876 A * | 1/1957 | Bowles et al. | 422/216 |
| 3,647,680 A * | 3/1972 | Greenwood et al. | 208/65 |
| 3,785,963 A | 1/1974 | Boyd | |
| 3,839,196 A | 10/1974 | Plackmann et al. | |
| 3,856,662 A | 12/1974 | Greenwood | |
| 4,218,338 A | 8/1980 | Huin et al. | |
| 4,406,775 A | 9/1983 | Bailor et al. | |
| 4,421,865 A * | 12/1983 | Shen | 521/31 |
| 5,130,106 A * | 7/1992 | Koves et al. | 422/216 |
| 5,141,625 A | 8/1992 | Lomas | |
| 5,558,767 A * | 9/1996 | Ressl | 208/105 |
| 5,620,589 A * | 4/1997 | Yan | 208/97 |
| 5,948,240 A | 9/1999 | Mulvaney et al. | |
| 6,165,350 A * | 12/2000 | Lokhandwala et al. | 208/103 |
| 6,432,369 B1 | 8/2002 | Mulvaney et al. | |
| 7,109,290 B2 | 9/2006 | McElvain et al. | |
| 7,253,005 B2 | 8/2007 | Coute et al. | |
| 2004/0129605 A1 * | 7/2004 | Goldstein et al. | 208/134 |

FOREIGN PATENT DOCUMENTS

EP 848051 6/1998

* cited by examiner

Primary Examiner — Melvin C Mayes
Assistant Examiner — Stefanie Cohen

(57) ABSTRACT

A catalytic reforming process including a reaction zone and a separate catalyst regeneration zone where catalyst is collected in a catalyst collector in the reaction zone and then directed to the catalyst regeneration zone wherein the catalyst collector is purged with a net gas stream.

20 Claims, 2 Drawing Sheets

CATALYTIC REFORMER CATALYST COLLECTOR INCLUDING PURGE GAS STREAM

BACKGROUND OF THE INVENTION (1) Field of the Invention

This invention concerns a catalytic reforming process including a catalyst collector that is purged with a purge gas stream derived from a net off gas slip stream.

(2) Description of the Art

Current catalytic reforming processes that include catalyst regeneration systems that employ a catalyst collector typically direct a purge gas derived from the recycle compressor discharge into the catalyst collector. Moreover, many catalytic reforming processes use recycle gas compressors having rotors that are continuously or intermittently washed with hydrocarbons. As a result of the hydrocarbon washing of the recycle gas compressor rotors, heavy hydrocarbon components enter the recycle gas stream. The additional heavy hydrocarbons in the recycle gas increases the dew point of the recycle gas to a point where components of the hydrocarbon wash medium can condense in poorly insulated lines or un-insulated flanges, in all ambient temperature conditions.

Where a recycle gas slip stream including heavy hydrocarbon components is directed as a purge gas to the catalyst collector, the deposition of liquid hydrocarbons from the hydrocarbon wash medium and subsequent absorption of hydrocarbons onto the catalyst in the catalyst collector creates a number of additional problems. One problem is that the spent catalyst in the catalyst collector becomes abnormally heavy, resulting in the inability to lift the catalyst from the bottom of the catalyst collector to the top of the catalyst regeneration vessel at normal lift conditions. Another problem that can be caused by the condensed hydrocarbon washing medium is that catalyst particles may adhere to one another preventing catalyst movement and lifting. In addition, normal purge gas exchanger outlet temperatures are not always sufficient to purge absorbed hydrocarbons from the catalyst and, as a result, hydrocarbons can be carried into the lift/dust collection circuit creating unsafe dust removal and hydrocarbon carryover into the catalyst regeneration tower.

SUMMARY OF THE INVENTION

This invention overcomes one or more of the problems recited above by using a net off gas stream as the source for the catalyst collector purge gas. Using a net off gas slip stream as the catalyst collector purge stream will prevent introduction of the heavy hydrocarbon into the purge gas circuit thereby avoiding lifting problems, catalyst movement problems and allows for the use of normal purge gas operating temperatures for cooling the catalyst for transfer to the regeneration section. Moreover preventing heavy hydrocarbon ingress into the regeneration tower will mitigate combusting this material in the catalyst regenerator which may otherwise cause excessive burn temperatures.

One aspect of this invention is a method for the gas purging of catalyst located in a catalytic reformer catalyst collector comprising the steps of: directing a hydrocarbon containing feed stream into a catalytic reforming reaction zone including a catalytic reforming catalyst and operating at catalytic reforming conditions to form a catalytic reforming reaction product stream wherein the catalytic reforming reaction zone includes a catalyst collector; directing the catalytic reforming product stream into a separator to form a separator gaseous product stream and a separator liquid product stream; directing at least a portion of the separator gaseous product stream to a recycle gas compressor including rotors; directing a portion of the separator gaseous product stream to a product recovery zone to form a compressed gaseous product stream; and directing a portion of the compressed gaseous product stream as a catalyst gas to the catalyst collector.

Another aspect of this invention is a catalytic reforming process comprising: a catalytic reforming reaction zone having a feed inlet, a catalyst inlet and a reaction product outlet, the catalytic reforming reaction zone including at least one reactor and a catalyst collector; a first separator having an inlet, a gas outlet and a liquid outlet wherein the reaction product outlet is directed to the first separator inlet; a recycle gas compressor including rotors where a portion of the separator gas outlet stream is directed to the recycle gas compressor inlet; a first net gas compressor having an inlet and an outlet wherein at least a portion of the first separator gas outlet stream is directed to the first net gas compressor inlet; a first net gas separator including an inlet and an gaseous product stream outlet wherein the first net gas compressor gas outlet stream is directed to the inlet of the first net gas separator; an optional second net gas compressor having an inlet and an outlet wherein at least a portion of the first net gas separator gaseous product stream outlet is directed to the inlet of the second net gas compressor; an optional second net gas separator including an inlet and a gaseous product stream outlet wherein at least a portion of a gaseous product stream selected from the first net gas separator gaseous product stream and the second net gas separator gaseous product stream is directed to the catalyst collector.

DETAILED DESCRIPTION OF THE INVENTION

The present invention relates to catalytic reforming processes and methods for their operation whereby a compressed net gas slip stream is directed from the catalytic reforming process to a catalyst collector associated with the catalytic reforming reaction zone where it is used as a catalyst collector purge gas. The catalyst collector purge gas assists in removing/separating hydrocarbons associated with the catalyst in the catalyst collector. The catalyst collector purge gas also helps to sweep hydrocarbon vapors from the catalyst collector before the catalyst is directed to the regeneration zone. The use of a compressed net gas slip stream as a catalyst collector purge gas is especially important where the recycle gas compressor vanes are washed with a hydrocarbon liquid. This is because some of the wash hydrocarbon liquid will typically contaminate the recycle gas which is a typical source of catalyst collector purge gas.

The use of a first stage or optionally second stage net gas separator off gas stream as the catalyst collector purge gas is preferred because the purge gas is from a high pressure source (first or second stage of net gas compression), moreover, net off gas streams are typically scrubbed by unit operations such as cooling, passing through a vapor/liquid disengagement vessel such as a separator or recontact drum, and/or passing through a mesh blanket to remove heavy hydrocarbons. As a result, the compressed net gas slip stream that is used as the catalyst collector purge gas is essentially free of the heavy hydrocarbon used to wash the compressor rotors and is of a similar molecular weight to recycle gas.

The catalytic reforming processes and apparatuses of this invention typically include a separate catalyst regenerator. The catalyst regenerator may be a batch, semi-continuous or continuous catalyst regenerator with continuous catalytic regenerator being preferred. Moreover, the catalytic reforming reaction zone may include one or more reactors operating at catalytic reforming reaction conditions where the product of each reactor is reheated before it is directed into a subsequent reactor. In is preferred that the catalytic reforming reaction zone includes from three to five and preferably four reactors.

Figure 1:
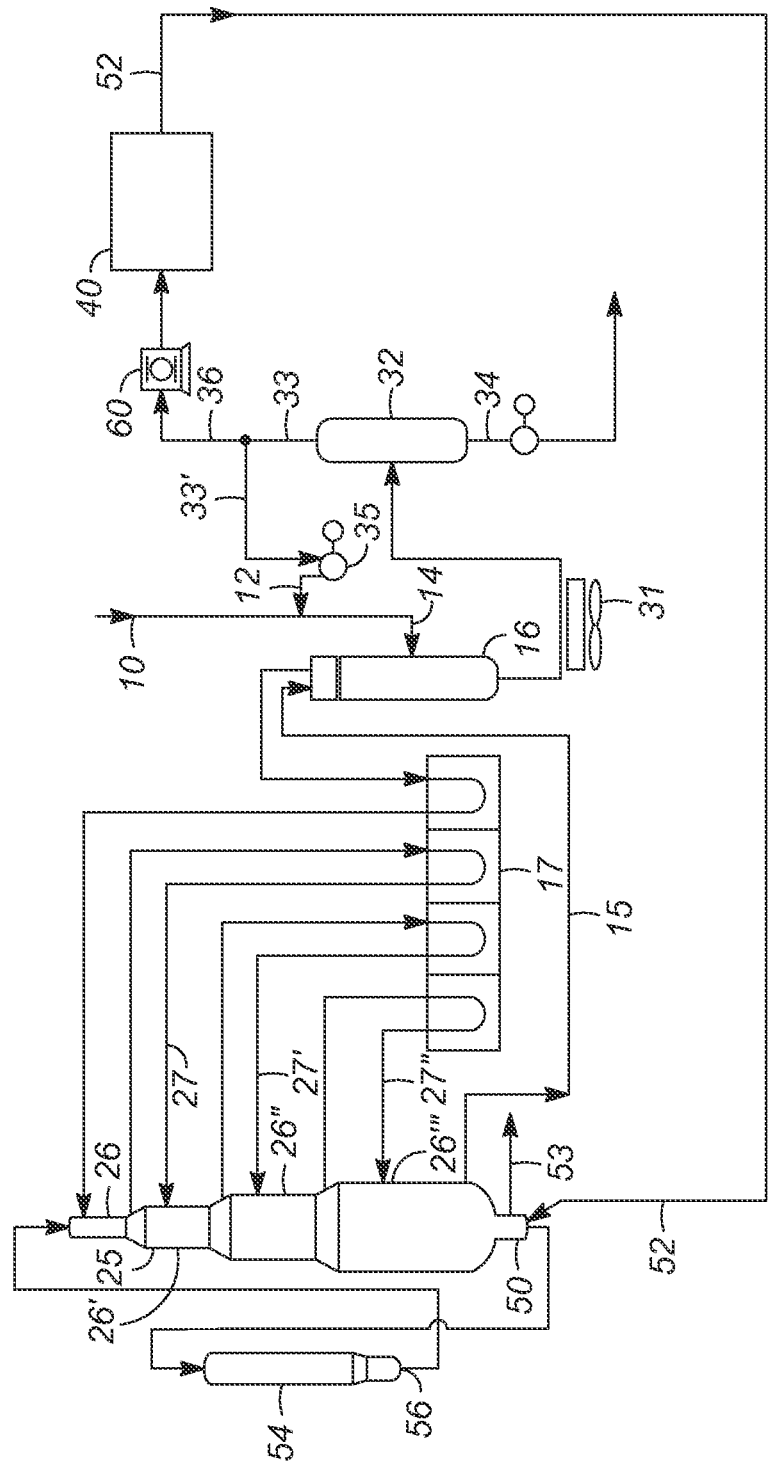
FIG. 1 is a schematic of a catalytic reforming process of this invention.

The process and methods of this invention will be discussed below with reference to FIGS. 1 and 2 where the process includes a continuous catalytic regenerator and four reaction zones. FIG. 1 is a schematic of a catalytic reforming reaction zone embodiment of this invention including a continuous catalyst regenerator vessel. In the FIG. 1 process, a naphtha feed stream 10 is combined with a recycle hydrogen gas stream 12 to form a combined feed stream 14. Combined feed stream 14 is heat exchanged against the reaction zone effluent 15 in a combined feed heat exchanger 16 and thereafter directed into a heating zone 17 where the combined feed is heated to a reaction temperature of from about 495 to about 525° C. at a pressure of from 5 to about 45 atm. In FIG. 1, reaction zone 25 includes four adiabatic radial flow reactors arranged in one or more vertical stacks. In the continuous catalyst regeneration embodiment, a catalytic reforming catalyst flows continuously by gravity vertically down the stack of reactors 26, 26'', 26''' and 26''' while the heated feed flows radially across the catalyst beds. The predominant reforming reactions are endothermic, so the effluent of reactors 26, 26' and 26'' are directed to the heating zone 17 to reheat the intermediate streams 27, 27' and 27'' to reaction temperatures.

Over time, coke accumulates on the catalytic reforming catalyst. Partially deactivated (spent) catalyst is withdrawn from the bottom of reactor 26''' and collected in catalyst collector 50. A purge gas steam 52 is directed into catalyst collector 50 to purge hydrocarbons from the catalyst and from catalyst collector vessel 50 that accompany the catalyst that is removed from reactor 26'''. The spent catalyst is directed to the top of continuous catalyst regenerator 54. The catalyst flows down though the catalyst regenerator 54 where carbon is burned off the catalyst and where levels of catalyst additives such as moisture and chloride can be optimally adjusted. Regenerated catalyst is lifted from bottom 56 of catalyst regenerator with, for example, a hydrogen rich gas stream, to the top of reactor 26.

Reaction zone effluent stream 15 from reactor 26''' is heat exchanged against the combined feed 14 in combined feed heat exchanger 16, cooled with cooler 31 and split in separator 32 into a gaseous product stream 33 and liquid product stream 34. Vapor product stream 33 is rich in hydrogen. A portion of vapor product stream 33' is directed to recycle compressor 35 where it is compressed and directed back to reaction zone 25. The remaining vapor product stream (net gas stream 36) is preferably compressed with first net gas compressor 60 and, along with liquid product stream 34, directed to product recovery zone 40.

In product recovery zone 40, net gas stream 36 is compressed and processed to increase the net gas hydrogen concentration. A portion of the compressed net gas product stream is then directed to the catalyst collector as purge gas stream 52. The purge gas exits catalyst collector 52 as purge gas outlet stream 53. The purge gas rate to the catalyst collector should be sufficient to purge the catalyst collector of essentially all unwanted hydrocarbons. Generally, the purge gas rate to catalyst collector 50 will be sufficient to ensure a thermal mass ratio of about 1:1. Moreover, the purge gas stream preferably has dew point that is below the designed temperature of purge gas outlet stream 53 from catalyst collector 50. In one embodiment, the purge gas outlet stream is designed to be about 150° C. Therefore, the purge gas in this preferred embodiment would have a dew point that does not exceed the purge gas outlet stream temperatures.

Figure 2:
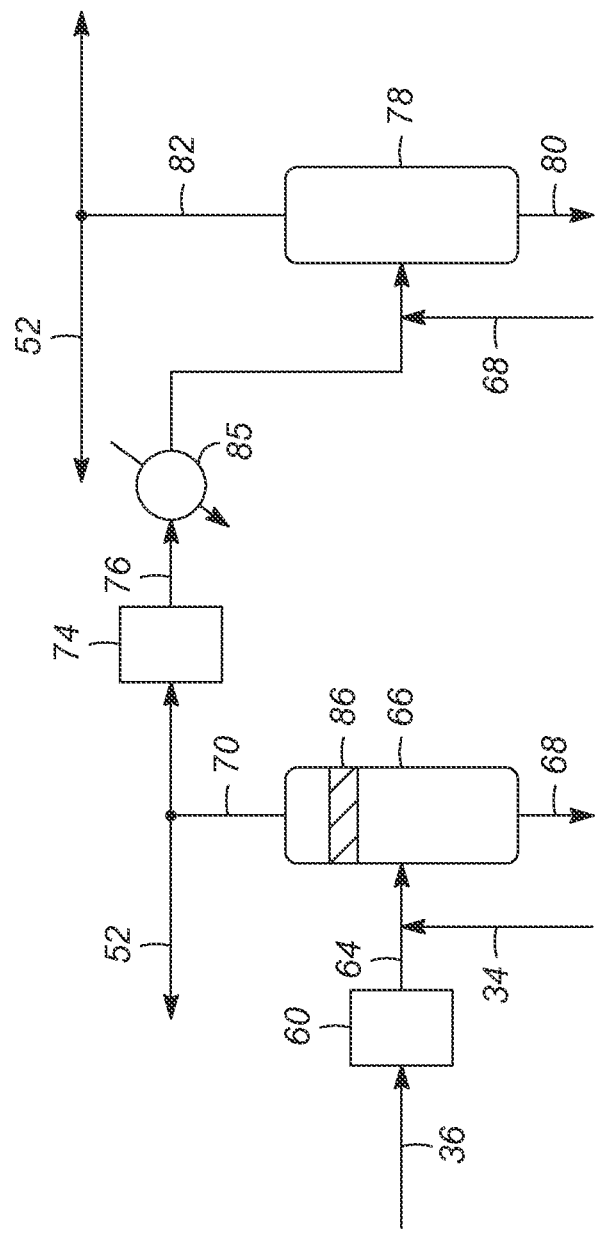
FIG. 2 is a schematic of a gaseous product recovery zone embodiment associated with a catalytic reforming process of this invention.

FIG. 2 shows a product recovery zone embodiment useful in the present invention. In FIG. 2, net gas stream 36 is directed to first net gas compressor 60 to form a first compressed net gas stream 64. The first compressed net gas stream 64 is directed into a first net gas separator 66 to form first net gas separator liquid product stream 68 and a first net gas separator gaseous product stream 70. In one embodiment, at least a portion of the first net gas separator gaseous product stream 70 is directed to the catalyst collector as purge gas stream 52.

In another embodiment, the first net gas separator overhead stream 70 is directed to the inlet of a second net gas compressor 74 which compresses the gas to form a compressed second net gas stream 76 which, in turn, is directed into second net gas separator 78. Second net gas separator 78 separates the compressed second net gas stream 76 into a second liquid product stream 80 and second net gas product stream 82. In this embodiment, at least a portion of the second net gas product stream 82 is directed to the catalyst collector as purge gas stream 52. In yet another alternative embodiment, a portion of both the first net gas product stream 70 and second net gas product stream 82 may be combined and directed to the catalyst separator as a purge gas stream 52.

The net gas product streams 70 and 82 are typically hydrogen rich gas streams that include small amounts of light hydrocarbons. The amount of light hydrocarbons in compressed net gas product streams 70 and 82 can be further reduced in the product recovery zone 40 by, for example, cooling the first or second net gas compressor outlet streams 64 and/or 76 with a heat exchanger such as heat exchanger 85 before the compressed stream(s) enter separators 66 and/or 78. Another optional method for maximizing net gas hydrogen content is to direct the compressed net gas through a mesh 86 that captures and removes entrained hydrocarbons from the gaseous stream. The mesh can be located in on of the separators or it can be located in line.

Still another useful method to improve the hydrogen purity of the net gas product streams is to direct the compressed net gas to separators that are recontact drums. A recontact drum is a separator such as separator 66 or 78 to which is fed a combined feed comprising a liquid hydrocarbon stream and a compressed net gas stream. The recontact drum is operated at temperatures and pressures that facilitate the removal of additional hydrocarbons from the net gas separators combined feed to 66 and/or 78. For example, in FIG. 2, at least a portion of liquid product stream 34 can be combined with compressed first net gas stream 64 to form a combined feed to first net gas separator 66. In yet another embodiment, a least a portion of first net gas separator liquid product stream 68 can be combined with second compressed net gas stream 76 to form a combined feed that is directed into second net gas separator 78.

The invention claimed is

1. A method for the gas purging of catalyst located in a catalytic reformer catalyst collector comprising the steps of:
  directing a hydrocarbon containing feed stream into a catalytic reforming reaction zone including a catalytic reforming catalyst and operating at catalytic reforming conditions to form a catalytic reforming reaction product stream wherein the catalytic reforming reaction zone includes a catalyst collector having a purge gas inlet, a purge gas outlet, and a catalyst outlet;

directing the catalytic reforming product stream into a separator to form a separator gaseous product stream and a separator liquid product stream;

directing at least a portion of the separator gaseous product stream to a recycle gas compressor including rotors;

directing a portion of the separator gaseous product stream to a product recovery zone to form a compressed gaseous product stream;

directing a portion of the compressed gaseous product stream as a catalyst gas to the purge gas inlet of the catalyst collector;

removing hydrocarbons and a portion of the catalyst gas from the catalyst collector through the purge gas outlet in a purge gas outlet stream wherein the purge gas outlet stream is removed from the catalytic reforming reaction zone at a different location from the catalytic reforming reaction product stream; and removing the catalyst from the from the catalyst collector through the catalyst outlet.

2. The method of claim 1 wherein the product recovery zone includes a first net gas compressor having an inlet and an outlet and a first net gas separator wherein the at least a portion of the separator gaseous product stream is directed to the first net gas compressor inlet and the first net gas compressor outlet is directed to the first net gas separator to form a first net gas separator gaseous product stream wherein the first net gas separator gaseous product stream is the compressed gaseous product stream.

3. The method of claim 2 wherein the first net gas separator is a recontact drum.

4. The method of claim 1 wherein the product recovery zone includes a first net gas compressor having an inlet and an outlet and a first net gas separator wherein the at least a portion of the separator gaseous product stream is directed to the first net gas compressor inlet and the first net gas compressor outlet is directed to the first net gas separator to form a first net gas separator gaseous product stream that is directed to an inlet of a second net gas compressor to form a second net gas compressor outlet stream wherein second net gas compressor outlet stream is directed to a second net gas separator for form a second net gas separator gaseous product stream wherein the second net gas separator gaseous product stream is the compressed gaseous product stream.

5. The method of claim 4 wherein the second net gas separator is a recontact drum.

6. The method of claim 1 wherein the recycle gas compressor rotors are washed with a liquid hydrocarbon.

7. The method of claim 1 wherein the recycle gas compressor rotors are washed continuously with a liquid hydrocarbon.

8. The method of claim 1 wherein the catalyst collector continuously collects a spent catalyst from the catalytic reforming reaction zone and directs the spent catalyst to a continuous catalyst regeneration zone to form a regenerated catalyst wherein the regenerated catalyst is directed to the catalytic reforming reaction zone.

9. The method of claim 1 wherein the catalyst collector purge gas stream is not heated before it enters the catalyst collector.

10. The method of claim 1 wherein the catalyst gas has a dew point of less than about 150° C.

11. The method of claim 1 wherein the catalyst gas has a dew point less than that of the purge gas outlet stream.

12. An apparatus for performing a catalytic reforming process comprising:

a catalytic reforming reaction zone having a feed inlet, a catalyst inlet and a reaction product outlet the catalytic reforming reaction zone including at least one reactor and a catalyst collector having a purge gas inlet, a purge gas outlet, and a catalyst outlet;

a first separator having an inlet, a gas outlet and a liquid outlet wherein the reaction product outlet is directed to the first separator inlet;

a recycle gas compressor including rotors where a portion of the separator gas outlet stream is directed to the recycle gas compressor inlet;

a first net gas compressor having an inlet and an outlet wherein at least a portion of the first separator gas outlet stream is directed to the first net gas compressor inlet;

a first net gas separator including an inlet and an gaseous product stream outlet wherein the first net gas compressor gas outlet stream is directed to the inlet of the first net gas separator;

an optional second net gas compressor having an inlet and an outlet wherein at least a portion of the first net gas separator gaseous product stream outlet is directed to the inlet of the second net gas compressor;

an optional second net gas separator including an inlet and a gaseous product stream outlet wherein at least a portion of a gaseous product stream selected from the first net gas separator gaseous product stream and the second net gas separator gaseous product stream is directed to the catalyst collector: and the purge gas outlet of the catalyst collector being different from the location of the reaction product outlet, and the catalyst outlet of the catalyst collector.

13. The apparatus for performing catalytic reforming process of claim 12 including a catalyst regeneration zone wherein a spent catalyst in the catalyst collector is directed into the catalyst regeneration zone for regeneration and wherein regenerated catalyst from the catalyst regeneration zone is directed to the catalytic reforming reaction zone.

14. The apparatus for performing a catalytic reforming process of claim 13 wherein the catalyst regeneration zone is a continuous catalyst regeneration zone.

15. The apparatus for performing a catalytic reforming process of claim 12 wherein the first net gas separator is a recontact drum.

16. The apparatus for performing a catalytic reforming process of claim 12 wherein the optional second net gas separator is a recontact drum.

17. The apparatus for performing a catalytic reforming process of claim 12 wherein first net gas separator gaseous product stream is directed to the catalyst collector.

18. The apparatus for performing a catalytic reforming process of claim 12 wherein the second net gas separator product stream is directed to the catalyst collector.

19. The apparatus for performing a catalytic reforming process of claim 12 wherein the recycle gas compressor rotors are washed with a liquid hydrocarbon.

20. The apparatus for performing a catalytic reforming process of claim 12 wherein the recycle gas compressor rotors are washed continuously with a liquid hydrocarbon.

* * * * *